United States Patent [19]

Fujioka et al.

[11] Patent Number: 5,070,590
[45] Date of Patent: Dec. 10, 1991

[54] METHOD OF MANUFACTURING WINDOW MOLDINGS FOR VEHICLE

[75] Inventors: Sakae Fujioka; Tatsuya Tamura, both of Yokohama, Japan

[73] Assignee: Hashimoto Forming Industry Co., Ltd., Yokohama, Japan

[21] Appl. No.: 572,237

[22] Filed: Aug. 24, 1990

Related U.S. Application Data

[62] Division of Ser. No. 276,386, Nov. 25, 1988, now Re. 4,968,543.

[30] Foreign Application Priority Data

Nov. 30, 1987 [JP] Japan ................. 62-302549

[51] Int. Cl.$^5$ ............................................. B23P 17/00
[52] U.S. Cl. ................................. 29/527.2; 29/527.1; 29/458; 264/171
[58] Field of Search .............. 29/527.1, 458, 527.2; 264/171, 45.9, 62

[56] References Cited

U.S. PATENT DOCUMENTS

| | | | |
|---|---|---|---|
| 3,490,139 | 1/1970 | McKinven, Jr. | 29/527.1 |
| 3,583,757 | 6/1971 | Wilfert | 296/93 X |
| 4,249,356 | 2/1981 | Noso | 296/93 X |
| 4,324,826 | 4/1982 | Ginster | 428/122 |
| 4,349,994 | 9/1982 | Maekawa | 428/122 X |
| 4,381,273 | 4/1983 | Azzola | 428/122 X |
| 4,441,755 | 4/1984 | Endo et al. | 428/31 X |
| 4,458,459 | 7/1984 | Irrgang | 52/208 |
| 4,532,741 | 6/1985 | Knudel | 52/208 X |
| 4,562,676 | 1/1986 | Kruschwitz | 52/208 |
| 4,568,119 | 2/1986 | Minami et al. | 296/93 |
| 4,576,773 | 3/1986 | Azzola et al. | 264/171 X |
| 4,621,469 | 11/1986 | Kruschwitz | 52/208 |
| 4,679,290 | 7/1987 | Adell | 29/458 X |
| 4,757,659 | 7/1988 | Miyakawa et al. | |
| 4,757,660 | 7/1988 | Miyakawa et al. | 296/93 X |
| 4,833,847 | 5/1989 | Inayama et al. | 52/208 |

FOREIGN PATENT DOCUMENTS

| | | |
|---|---|---|
| 8692 | 1/1968 | Australia . |
| 0270337 | 6/1988 | European Pat. Off. . |
| 8123350 | 12/1981 | Fed. Rep. of Germany . |
| 3048889 | 7/1982 | Fed. Rep. of Germany . |
| 57-54416 | 11/1982 | Japan . |
| 62-231814 | 10/1987 | Japan . |

*Primary Examiner*—Carl J. Arbes
*Attorney, Agent, or Firm*—Stevens, Davis, Miller & Mosher

[57] ABSTRACT

The disclosure relates to a molding member, for instance for automobile windshields or rear windows, formed at least partly of an extruded body of a synthetic resin material, as well as a method of manufacturing such molding members. The molding member has an integral lip section in the form of a ridge which extends throughout the entire length, as well as a core element embedded in the main body to extend into the lip section. Typically, the lip section bears against the outer surface of the window pane along the upper portion to form a flush outer surface along junctions between the upper edge of the window same and the body panel, but is spaced therefrom along the side portions to define a weir. The weir is formed by plastically deforming a predetermined portion of the core element. The weir prevents flow of rain water across the molding member and around the side of the vehicle or, in the case of a rear window, rain water moving across the roof and downwardly over the rear window so as to preserve the driver's or passangers sight through a window.

8 Claims, 3 Drawing Sheets

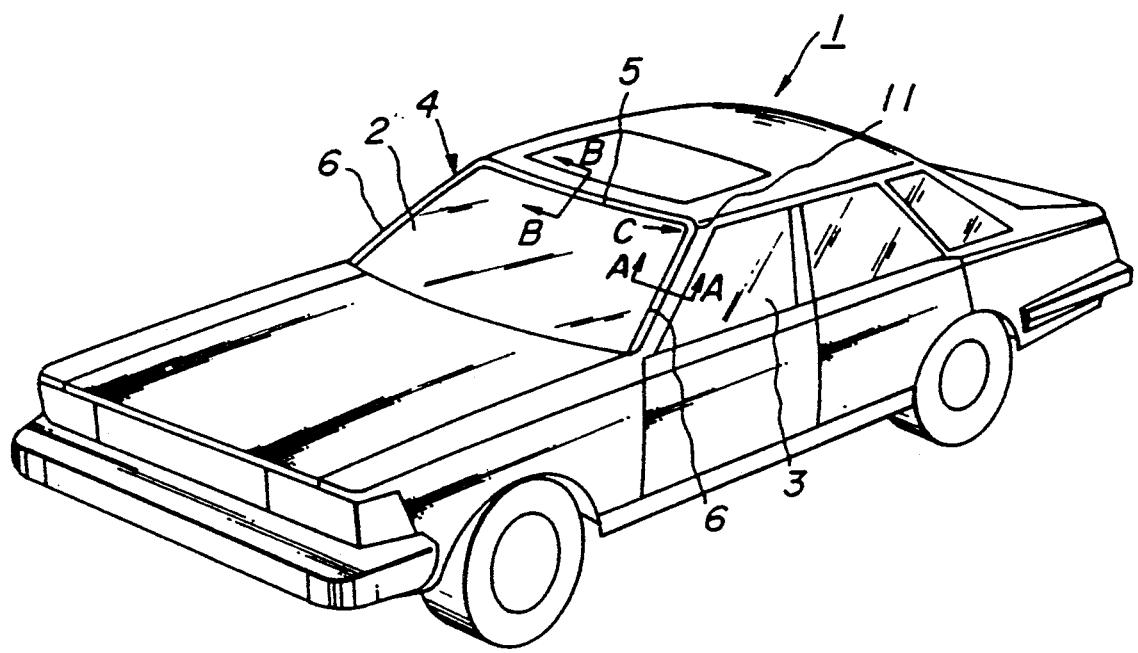
FIG_1

FIG_2
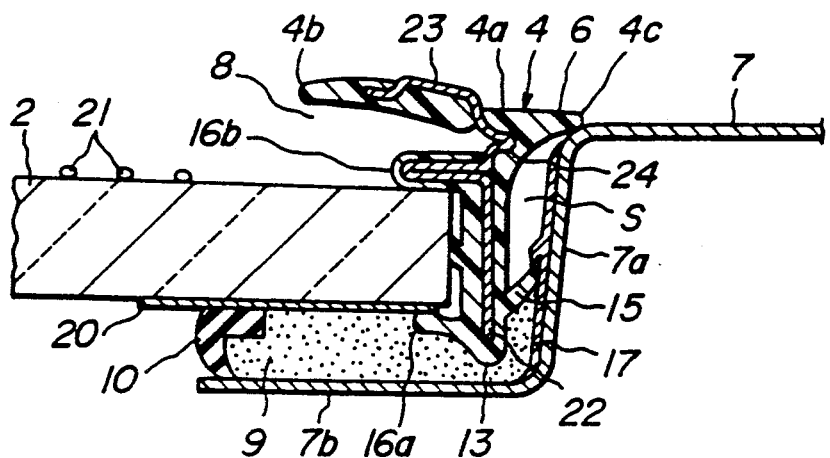
FIG_3
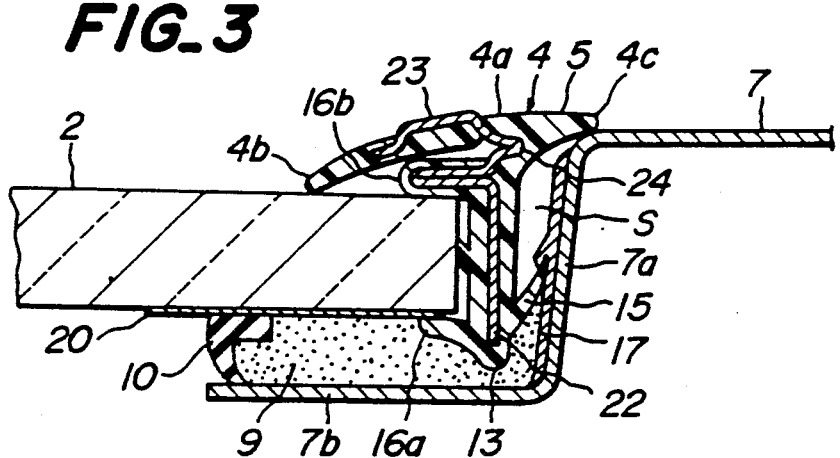
FIG_4
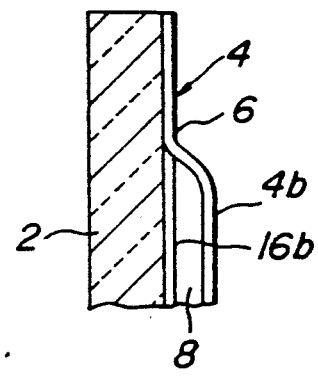
FIG_5
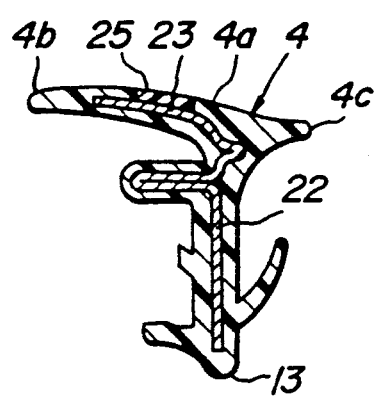

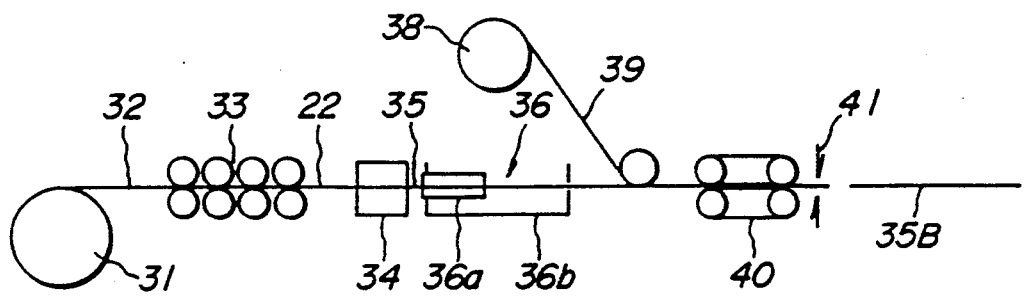
FIG_6
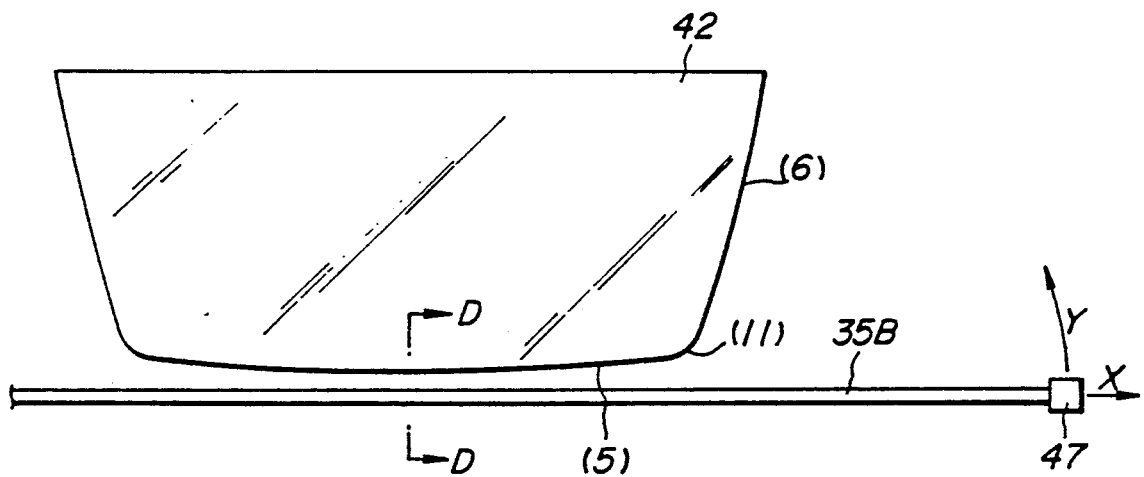
FIG_7
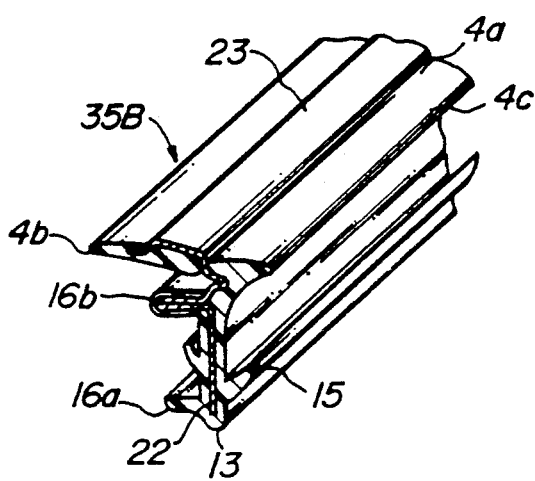
FIG_8
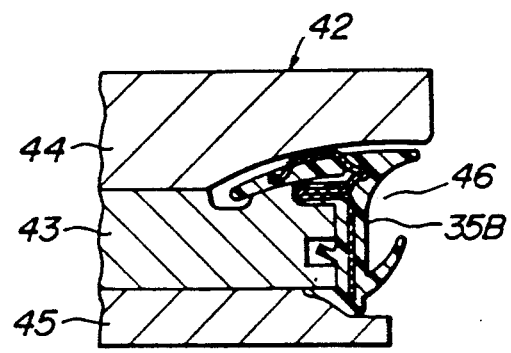
FIG_9

METHOD OF MANUFACTURING WINDOW MOLDINGS FOR VEHICLE

This is a division of application Ser. No. 07/276,386, filed Nov. 25, 1988, now U.S. Pat. No. 4,968,543 issued Nov. 6, 1990.

BACKGROUND OF THE INVENTION

1. Field of the Invention

The present invention relates to a window molding member, for instance for automobiles, as well as a method of manufacturing such molding members.

2. Description of the Related Art

An automobile employs various kinds of molding members, of which a typical example is a window molding member adapted to extend along the periphery of the front or rear window panes, i.e. along a pair of front or rear pillars and the front or rear edge of the roof panel of the automobile body. A variety of requirements are imposed on molding members mainly from design and/or functional viewpoint, and result in an increased demand in the automobile industry for the molding members whose cross-sectional shape varies in the longitudinal direction.

Specifically, one proposal is disclosed for example in Japanese Utility Model Application Publication No. 57-54,416, which is directed to a window molding member having an upper portion with a first predetermined cross-section, at least one side portion with a second predetermined cross-section, and at least one corner portion arranged between the side and upper portions. When the molding member is arranged along the periphery of a front window pane the first cross-section of the upper portion contributes to form a so-called flush outer surface of the automobile body, while the second cross-section of the side portion serves to define at least one channel or weir along the side edges of the window pane. Such an arrangement of the molding member ensures that, during driving in rainy conditions, the weir effectively prevents rain water on the window pane from flowing across the side portion toward the side window, to preserve the driver's and/or front seat passenger's view through the side windows.

To produce a window molding member with a cross-section which varies in the longitudinal direction, it is possible to physically divide each molding member into first and second extruded portions with the respectively predetermined cross-sectional shapes, which are connected with each other either by an injection molding process or by using a separate corner connection piece. However, connection of these two portions by means of an injection molding result in formation of undesirable burrs along the juctions and deterioration in the appearance, while use of a corner connection piece results in an increased number of the required components and assembly steps.

Another possibility for manufacturing molding members with a longitudinally variable cross-section is disclosed in Japanese Patent Application Laid-open No. 62-231,814, wherein the main body of the molding member has a lip section in the form of a ridge, and two leg sections both to be inserted into a gap between the automobile body panel and the window pane. In use, the first leg section along the upper and side portions of the molding member is engaged by a retainer member on the automobile body panel such that the molding member is retained in position. Furthermore, the second leg section is directly engaged with the periphery of the window plate along the upper portion whereby the lip section is brought into direct contact with the surface of the window plate along the upper portion, while a separate erection member accommodating the second leg section therein is engaged with the periphery of the window pane along the side portion such that the second leg section is supported by the erection member and urges and deforms the lip section away from the surface of the window pane along the side portion to form a weir between the window plate and the ridge. Such an arrangement provides refined appearance due to the continuous and smooth surface along the corner portions integrally connecting the upper and side portions with each other. However, use of erection members along both side portions is sometimes problematic in that, besides an increased number of required components and assembly steps, the lip section tends to be deformed when an external force is applied, and it is difficult to stably maintain the desired cross-section of the weir for a long period.

SUMMARY OF THE INVENTION

Therefore, it is a primary object of the present invention to provide a novel window molding member with a longitudinally variable cross-section, which can be readily realized in a facilitated manner and with improved productivity, in which the deformation of the lip section can be effectively suppressed even when it is applied with external force, and in which the desired shape of the bank or channel or weir (hereinafter referred to as "weir") can be stably maintained for a long period.

Another object of the present invention is to provide a novel method by which window molding members with a longitudinally variable cross-section can be produced in a facilitated manner and with improved productivity, and which makes it possible to effectively suppress the deformation of the lip section even when it is applied with external force, and to maintain the desired cross-section of the weirs in a stable manner and for a long period.

According to one aspect of the present invention, there is provided a window molding member, for instance for automobiles, comprising: a main body composed at least partly of a continuous elongate member, including an upper portion to extend along an upper edge of a window pane, at least one side portion to extend along a side edge of the window pane, and at least one corner portion connecting said upper portion and said side portion with each other; said main body having a curvature in its longitudinal direction which corresponds to the contour of said window pane, and further including an integral lip section which extends over the entire length thereof, and a core element embedded in the main body; said core element extending into said lip section and being subjected to such a plastic deformation at least locally in the longitudinal direction of the core element, that said lip section has a first cross-section along said upper portion of the main body, a second cross-section along said side portion of the main body, and a transitional cross-section along said corner portion of the main body where the first cross-section gradually changes to the second cross-section, one of said first and second cross-section defining at least one weir when the molding member is mounted in place, which extends along said upper portion or said side portion such that rain water can be guided along the weir and prevented from flowing across the molding member.

According to another aspect of the present invention, there is provided a method of manufacturing window moldings, for instance for automobiles, comprising the steps of: forming a main body composed at least partly of a continuous elongate material, including an upper portion to extend along an upper edge of a window pane, at least one side portion to extend along a side edge of the window pane, and at least one corner portion connecting said upper portion and said side portion with each other, the main body further including an integral lip section formed to extend over the entire length thereof, and a core element embedded in the main body and extending into said lip section; subjecting said main body to an axial bending to have a curvature in its longitudinal direction corresponding to the contour of said window pane; and subjecting said core element to such a plastic deformation at least locally in the longitudinal direction of the core element, such that said lip section has a first cross-section along said upper portion of the main body, a second cross-section along said side portion of the main body, and a transitional cross-section along said corner portion where the first or second cross-section gradually changes to the second or first cross-section, one of said first and second cross-sections being adapted to define at least one weir when the molding member is mounted in place, which extends along said upper portion or said side portion so that rain water can be guided along the weir and prevented from flowing across the molding member.

In accordance with the present invention, the longitudinally variable cross-section of the molding mamber can be readily realized, simply by plastically deforming the core element such that the lip section defines at least one weir along the side portion of the molding member when it is for a front window pane, or defines a weir along the upper portion of the molding member when it is for a rear window pane. The desired cross-section of the weir can be obtained by the plastically deformed core element, without separately prepared erection members to form the weirs, so that the present invention makes it possible, not only to highly improve the productivity and to preserve an excellent appearance of the product, but also to suppress undesirable deformation of the lip section even when it is applied with external force, and to maintain the desired cross-section of the weirs in a stable manner and for a long period.

BRIEF DESCRIPTION OF THE DRAWINGS

FIG. 1 is a perspective view of an automobile with window molding members to which the present invention may be applied;

FIG. 2 is a cross-sectional view, taken along the line A—A in FIG. 1, of the side portion of a front window molding member according to one embodiment of the present invention;

FIG. 3 is a cross-sectional view, taken along the line B—B in FIG. 1, of the upper portion of the window molding member of FIG. 2;

FIG. 4 is a fragmentary view, as seen in the direction of arrow C in FIG. 1, of the window molding member of FIG. 2;

FIG. 5 is a cross-sectional view, similar to FIG. 2, of the front window molding member according to another embodiment of the present invention;

FIG. 6 is a system diagram of one example of the production line which is adapted to carry out the method of the present invention for producing the window molding members;

FIG. 7 is a plan view of an axial bending and shaping device to be used in conjuction with the production line of FIG. 6;

FIG. 8 is a fragmentary perspective view of the window molding member to be subjected to axial bending and shaping by the device of FIG. 7; and FIG. 9 is a sectional view taken along the line D—D in FIG. 7.

DETAILED EXPLANATION OF THE PREFERRED EMBODIMENTS

The present invention will now be explained in further detail, by referring to some preferred embodiments shown in the attached drawings.

There is shown in FIG. 1 an automobile which is designated as a whole by reference numeral 1, and which includes a front window pane 2 and side window panes 3. The front window pane 2 may be composed of a transparent inorganic glass or transparent synthetic resin, such as polycarbonate resin, acrylic resin or the like, and is secured to the automobile body panel 7 by means of an adhesive material 9, with a rubber dam member 10 arranged between the window plate 2 and a depressed seat portion 7b of the panel 7. The window pane 2 may be provided on its rear surface with an opaque printed layer 20 which extends along the periphery of the plate 2 such that the adhesive material 9 and the dam member 10 are not visible from outside, to form a refined appearance.

The front window plate 2 is associated with an elongate window molding member 4 which is arranged to cover a gap or space S between the automobile body panel 7 and the peripheral edge of the front window pane 2, as particularly shown in FIGS. 2 and 3. The molding member 4 has a pair of side portions 6 (FIG. 2) along the side edges of the window plate 2, an upper portion 5 (FIG. 3) along the upper edge of the window plate 2, and a pair of transitional portions 11 where the cross-section of the side portions 6 gradually changes to that of the upper portion 5.

The molding member 4 has a main body 4a composed of a flexible and/or soft polyvinylchloride (PVC) resin, ionomer resin, ethylenevinyl acetate copolymer (EVA) resin, transparent cellulose acetate butylate (CAB) resin, appropriate synthetic rubber material or other suitable thermoplastic and elastomeric synthetic resin material with a flexibility. The material forming the main body 4a is co-extruded with a core element 22 with an ornamental portion 23, into an elongate member with a substantially constant cross-section. The core element 22 is substantially completely embedded into the material of the main body 4a, with the exception that the ornamental portion 23 having an outer surface with a metallic luster or desired color is exposed outside.

The main body 4a includes a leg section 13 to be inserted into the space S between the automobile body panel 7 and the edge of the front window plate 2, as well as a pair of lip sections 4b, 4c formed on the top of the leg section 13 to project from both sides thereof. These lip sections are each in the form of a ridge which extends along the entire length of the extruded elongate member. The lip section 4c has a free end bearing against the outer surface of the automobile body panel 7 in the upper and side portions 5, 6 of the molding member 4 (FIGS. 2 and 3). On the other hand, the lip section 4b has a free end which bears against the outer surface of the window plate 2 in the upper portion 5 (FIG. 3), but which is spaced therefrom along the side portions 6 of the molding member 4 so as to define a weir 8.

The leg section 13 of the main body 4a has at least one fin 15 formed on that side which is remote from the window plate 2. The fin 15 is engageable with an elongate strip-like retainer 17 which is secured to a shoulder portion 7a of the body panel 7 adjacent to the depressed seat portion 7b. The leg section 13 has a free end in the form of a projection 16a which is engageable with the rear edge of the window plate 2, as well as an additional projection 16b which, in turn, is engageable with the front edge of the window plate 2.

The core element 22 embedded in the main body 4a is composed of a metal sheet with a sufficient strength to reinforce the material of the main body 4a, and may thus be composed of stainless steel sheet, aluminum sheet, galvanized steel sheet, or the like. Furthermore, when the core element 22 is composed of a galvanized steel sheet, it is advantageous to form the ornamental portion 23 by adhering a lustrous metal foil or sheet, colored resin sheet, or the like, and to embed all the remaining portions into the material of the main body 4a. The core element 22 has such a profiled cross-section with one or more folded portions 24, that it is present in the projection 16b, and also extends into the ridge 4b.

The window molding member 4 of such arrangement includes integrally connected upper and side portions 5, 6, and a lip section 4b in the form of a ridge which has been subjected to such a plastic or non-elastic deformation that its cross-section along the upper portion 5 differs from that along the side portions 6.

FIG. 5 is a cross-sectional view, also taken along the line A—A in FIG. 1, showing another embodiment of the window molding member wherein the core element 22 is not exposed outside, and a transparent resin layer 25 is formed on the outer surface of the ornamental portion 23 of the core element 22 such that the ornamental portion 23 is visible from outside. The transparent resin layer 25 may be replaced by appropriately colored opaque resin layer, to form an ornamental portion separately from the core element 22, if desired.

The window molding member of the above mentioned embodiments can be advantageously produced by the method according to the present invention, with a production line to be fully described hereinafter.

There is shown in FIG. 6 a system diagram of the production line which includes a first uncoiler 31 for continuously supplying a metal sheet or the like strip material 32 to a roll forming machine 33, where it is shaped into the desired cross-sectional profile of the core element 22, which is then supplied to an extrusion die 34 and co-extruded with a thermoplastic resin, such as a PVC resin into a continuous rod 35 of the configuration as shown in FIG. 8, having a cross-section corresponding to that shown in FIG. 2. The so-formed continuous rod 35 is fed to a sizing/cooling station 36 which includes a sizing device 36a and a cooling tank 36b. At this station 36, the continuous rod 35 is subjected to a required sizing and also to a simultaneous cooling in a cooling tank 36b. The continuous rod 35 is then covered by a protective tape 39 supplied from an uncoiler 38, is hauled by an appropriate hauling device 40, and is further fed to a cutting station 41 where it is successively cut into an elongate member 35B with a predetermined length.

The so-obtained elongate member 35B with the predetermined length, obtained as above, is generally straight in its longitudinal direction, and has a constant cross-section along the entire length, corresponding to the cross-section of the molding member 4 in its side portion 6 (FIG. 2). Consequently, it is necessary to axially bend the elongate member 35B into conformity with the contour of the window plate 2, and also to plastically deform the lip section 4b and the core element 22 locally in the longitudinal direction to realize the cross-section of the molding member 4 in its upper portion 5 (FIG. 3). It is for this reason that the above-mentioned production line is followed by an axial bending and shaping device 42 to be described hereinafter.

The shaping device 42 includes, as particularly shown in FIGS. 7 and 9, a central die plate 43, and upper and lower die plates 44, 45 on both sides thereof. These die plates 43, 44, 45 are superimposed upon, and united with each other to form an integral abutment die assembly having in its outer periphery a shaping groove 46, which is adapted to receive the elongate member 35B. The central die plate 43 has an outer contour which substantially corresponds to that of the window plate 2, and is adapted to support the lip section 4b and the projection 16b of the leg section 13. The upper die plate 44 cooperates with the central die plate 43 such that the lip section 4b is urged against that portion of the central die plate 43 which corresponds to the upper portion 5, as shown in FIG. 9, and is kept spaced from those portions of the central die plate 43 which correspond to the side and the corner portions 6, 11. On the other hand, the lower die plate 45 is to support the projection 16a of the leg section 13. The shaping device 42 further includes a pair of chucks 47, only one of which is shown in FIG. 7, for clamping both ends of the elongate member 35B.

The elongate member 35B is subjected to an axial bending and also to a local plastic deformation of the lip section 4b in the following manner. First of all, as shown in FIG. 7, the elongate material 35B is clamped on its both ends by chucks 47, and is aligned with and urged against the shaping groove 46 while a tension is being applied in the direction X. Thereafter, the chucks 46 are moved in the direction Y, and the core element 22 of the elongate member 35B is subjected to a required plastic deformation, to induce the plastic deformation of the lip section 4b simultaneously with the axial bending such that it can be brought into contact with the window plate 2 along the upper portion 5. In this case, when the core element 22 is plastically deformed around the folded portion 24, it is possible to deform the lip section 4b without subjecting the remaining portions to an excessive deformation. Finally, the ends of the elongate member 35B are disengaged from the chucks 47 and cut away to form a finished molding member 4.

The window molding member 4 produced as above is mounted in place in the following manner. First of all, the elongate retainer member 17 is previously adhered to the entire periphery, except the lower portion, of the shoulder portion 7a of the automobile body panel 7 which has already been subjected to painting and baking. While the rear surface of the outer periphery of the window pane 2, which has already been formed with an opaque printed layer 20, is further provided with a dam rubber 10, and the entire periphery on the rear surface of the window pane 2, including the lower portion, is applied with a liquid adhesive material 9 after projections 16a, 16b of the window molding member 4 have been engaged with the periphery of the window pane 2. This assembly is then fitted into the shoulder portion 7a of the automobile body panel 7, and is firmly secured after the hardening of the adhesive material 9, with the retaining fins 15 in engagement with the retainer member 17.

The window molding member 4 mounted in place covers the space S between the window pane 2 and the automobile body panel 7. The free end of the lip section 4b along the upper portion 5 of the molding member 4 is in contact with the outer surface of the window pane 2, as shown in FIG. 3, and contributes to realize smooth or so-called flush outer surface of the automobile body. The free end of the lip section 4b along the side portions 6 of the molding member 4 is spaced from the outer surface of the window pane 2, as shown in FIG. 2, and cooperates with the window pane 2 to form the weirs 8 therebetween. Thus, during driving in rainy conditions, the rain water 21 on the window pane 2 is collected into, and guided by the weirs 8 along the side portions 6, and can be prevented from flowing onto the side windows 3. Despite absence of the weir 8 along the upper portion 5, the above-mentioned window molding member 4 has corner portions 11 by which the upper and side portions 5, 6 are continuously connected with each other, making it possible to provide a refined appearance along the corner portions 11. Moreover, as the weirs 8 along the side portions 6 are formed by the lip section 4b which is reinforced by the core element 22, it is possible to effectively prevent or suppress the deformation of the lip section 4b even when it is subjected to external force, and to stably maintain the desired shape of the weirs 8 for a long period.

The configuration, structure, material, etc., of the molding member 4 are not limited to those illustrated in the drawings, for which various modifications may be made. Similarly, various processes may be used to form the elongate member 35B and to deform the lip section 4b.

For example, the molding member 4 according to the present invention may be used in conjunction with an automobile rear window plate, with the lip section defining a weir along the upper portion to prevent the rain water on the roof panel from flowing across the upper portion onto the rear window plate.

The above-mentioned embodiment of the method according to the present invention, wherein the elongate member 35B as extruded has the cross-section of the side portions 6 throughout its entire length and is then subjected to a local plastic deformation of the lip section 4b to have the cross-section of the upper portion 5, is also subject to modifications. More particularly, the extruded elongate body 35B may have the cross-section of the upper portion 5 throughout the entire length, and may be subjected to a local plastic deformation of the lip section 4b to have the cross-section of the side portions 6. Alternatively, the elongate member 35B may have an intermediate cross-section that the lip section 4b is slightly spaced from the outer surface of the window plate 2, and may be subjected to deformation of the lip section 4b along the entire length to have the cross-section of the upper portion 5 and side portions 6.

Furthermore, the die plates in the shaping device 42, particularly the upper die plate 44, should have an outer surface which effectively prevents the elongate member 35B from becoming scratched during the axial bending thereof. Thus, the die plates may be formed of synthetic resin material with a low friction resistance as well as a sufficient hardness, or may be formed of a metallic material whose surface to be brought into contact with the elongate member 35B is a mirror-like finished surface.

Although the deformation of the lip section 4b is advantageously carried out simultaneously with the axial bending, depending upon the cross-sectional shape of the window molding member 4, the section 4b may be deflected and deformed downwardly by lowering a separate upper die plate after the axial bending.

Finally, when there is a fluctuation or difference in the distance between the front or rear pillars of the automobile body panel, the molding member may be divided into separately prepared right and left molding halves, which are to be connected at the center of the upper edge of the window plate by using a connector. Even with this arrangement, an uninterrupted connection along the corner portions of the molding member, between the upper and side portions thereof, provides a more refined appearance as compared with the conventional molding member which includes separate connection pieces along the corner portions whereby the connections between the upper and side portions are interrupted.

It will be readily appreciated from the foregoing detailed description that, according to the present invention, the lip section and the core element are subjected to a plastic deformation to define the weirs along the side portions or upper portion for preventing the flow of rain water across the relevant portion. Such a novel structure of the window molding member is realized with a minimized number of components of a simplified structure, is easy to produce and assemble, and is capable of suppressing undesirable deformation of the lip section even when it is applied with external force, and maintaining the desired shape of the weirs in a stable manner and for a long period. Moreover, the core element arranged also in the lip section effectively prevents or suppresses undesired deformation thereof during the axial bending of the elongate member, and makes it possible to plastically deform the lip section to define the weirs without requiring heat treatment or the like specific measures.

What is claimed is:

1. A method of manufacturing front window molding members for motor vehicles, comprising the steps of:
   forming a substantially straight main body for a molding member, said main body being composed at least partly of a continuous elongate material and including an upper portion to extend along an upper edge of a front window pane, at least one side portion to extend along a side edge of the window pane, and at least one corner portion connecting said upper portion and said side portion with each other, the main body further including a lip section of a longitudinally constant initial cross-section, said lip section extending over the entire length of the main body, and a plastically deformable core element integral with and extending into said lip section;
   subjecting said main body to an axial bending to form a curvature in its longitudinal direction corresponding to the contour of said window pane; and
   subjecting said core element to a plastic deformation at least locally in the longitudinal direction of the core element such that said lip section has a first cross-section along said upper portion of the main body with said lip section being substantially in contact with said window pane, a second cross-section along said side portion of the main body with said lip section being spaced from said window pane, and a transitional cross-section where the first cross-section changes to the second cross-section, said lip section along said side portion of the main body defining a weir when the molding member is mounted in place, whereby rain water can be guided along the weir and prevented from flowing across the molding member.

2. The method as claimed in claim 1, wherein said step of forming the main body comprises extrusion of a synthetic resin material.

3. The method as claimed in claim 2, wherein said synthetic resin material is co-extruded with said core element, which is composed of a metal strip.

4. The method as claimed in claim 1, wherein said step of subjecting the core element to said plastic deformation is carried out substantially simultaneously with said step of subjecting the main body to said axial bending.

5. A method of manufacturing rear window molding members for motor vehicles, comprising the steps of:

forming a substantially straight main body for a molding member, said main body being composed at least partly of a continuous elongate material and including an upper portion to extend along an upper edge of a rear window pane, at least one side portion to extend along a side edge of the window pane, and at least one corner portion connecting said upper portion and said side portion with each other, the main body further including a lip section of a longitudinally constant initial cross-section, said lip section extending over the entire length of the main body, and a plastically deformable core element integral with and extending into said lip section;

subjecting said main body to an axial bending to form a curvature in its longitudinal direction corresponding to the contour of said window pane; and subjecting said core element to a plastic deformation at least locally in the longitudinal direction of the core element such that said lip section has a first cross-section along said upper portion of the main body with said lip section being spaced from a vehicle body panel adjacent to said upper edge of the window pane, a second cross-section along said side portion of the main body with said lip section being substantially in contact with an adjacent body panel, and a transitional cross-section where the first cross-section changes to the second cross-section, said lip section along said upper portion of the main body defining a weir when the molding member is mounted in place, whereby rain water can be guided along the weir and prevented from flowing across the molding member.

6. The method as claimed in claim 5, wherein said step of forming the main body comprises extrusion of a synthetic resin material.

7. The method as claimed in claim 6, wherein said synthetic resin material is co-extruded with said core element, which is composed of a metal strip.

8. The method as claimed in claim 5, wherein said step of subjecting the core element to said plastic deformation is carried out substantially simultaneously with said step of subjecting the main body to said axial bending.

* * * * *